United States Patent
Freund et al.

(10) Patent No.: US 8,303,422 B2
(45) Date of Patent: Nov. 6, 2012

(54) TORSIONAL OSCILLATION DAMPER

(75) Inventors: Wolfgang Freund, Langenbernsdorf (DE); Andreas Kissler, Crimmitschau (DE); Juergen Schulze, Chemnitz (DE)

(73) Assignee: Asturia Automotive Systems AG, Munich (DE)

( * ) Notice: Subject to any disclaimer, the term of this patent is extended or adjusted under 35 U.S.C. 154(b) by 370 days.

(21) Appl. No.: 12/566,159

(22) Filed: Sep. 24, 2009

(65) Prior Publication Data

US 2010/0082165 A1    Apr. 1, 2010

(30) Foreign Application Priority Data

Sep. 26, 2008 (DE) .................... 20 2008 012 811 U

(51) Int. Cl.
*F16D 3/80* (2006.01)
*F15B 15/06* (2006.01)

(52) U.S. Cl. .............................. 464/24; 92/31
(58) Field of Classification Search ............... 464/68.3, 464/24, 106, 137–139; 74/89, 25, 50, 55, 74/572.4–574.4; 92/31, 84, 33; 700/280
See application file for complete search history.

(56) References Cited

U.S. PATENT DOCUMENTS

| | | | |
|---|---|---|---|
| 4,133,215 A * | 1/1979 | Norris et al. ...................... 74/89 |
| 4,501,348 A | 2/1985 | Lutz et al. | |
| 4,619,627 A * | 10/1986 | Balken et al. .................... 464/24 |
| 6,047,804 A | 4/2000 | Feldhaus et al. | |
| 7,992,485 B2 * | 8/2011 | Lezock et al. .................... 92/31 |
| 8,075,410 B2 * | 12/2011 | Carlson et al. .................. 464/24 |
| 2007/0060400 A1 | 3/2007 | Kobelev | |

FOREIGN PATENT DOCUMENTS

| | | |
|---|---|---|
| CA | 2500395 A1 * | 4/2004 |
| DE | 32 28 673 | 3/1983 |
| DE | 197 33 334 | 2/1999 |
| DE | 198 12 303 A1 | 9/1999 |
| DE | 10 2005 037 996 | 8/2006 |
| DE | 20 2006 01635 | 4/2008 |
| WO | WO 2008/049382 | 5/2008 |

OTHER PUBLICATIONS

German Search Report dated Apr. 15, 2009.

* cited by examiner

*Primary Examiner* — Gregory Binda
*Assistant Examiner* — Matthieu Setliff
(74) *Attorney, Agent, or Firm* — Crowell & Moring LLP

(57) ABSTRACT

A torsional vibration damper (1) comprising two elements (4, 5) which are rotatable relative to one another making use of at least one coupling part (3) which is arranged axially displaceable in a housing (2), in which the housing (2) is divided by the coupling element (3) into a first pressure chamber/partial chamber (D1) and a second pressure chamber/partial chamber (D2), and the first pressure chamber (D1) is connected to a first damping chamber (12) and the second pressure chamber (D2) is connected to a second damping chamber (13) and the first pressure chamber (D1) is filled with a damping medium (10) and the first damping chamber (12) is filled with the damping medium (10) and/or a first damping element (14) and the second pressure chamber (D2) is filled with a damping medium (10) and the second damping chamber (13) is filled with the damping medium (10) and/or a second damping element (15).

11 Claims, 1 Drawing Sheet

TORSIONAL OSCILLATION DAMPER

BACKGROUND OF THE INVENTION

The present invention relates a torsional vibration damper which is inserted between a driving system and a driven system and serves to dampen input and output vibrations and even out torque variations.

Numerous torsional vibration dampers are known in which a drive element and a driven element are connected by a torsional spring for torque transmission. See, for example, US 2007/060400A1 (=DE 10 2005 037 996).

Systems are also known wherein a torsional vibration is damped by spring elements which can be loaded in a radial or peripheral direction. See, for example, DE 198 12 303 A1 and U.S. Pat. No. 6,047,804 (=DE 197 33 334).

U.S. Pat. No. 4,501,348 (=DE 32 28 673) describes a torsional vibration damper with a laterally displaceable damping element. The torsional vibration damper which is suited in particular for the clutch disk of a motor vehicle has two damper parts which are twistable relative to one another about a common rotational axis and are coupled to one another via an axial thrust surface and a coupling part. On relative rotation of the damper parts, the coupling part is displaced against the axial force of springs. The coupling part can be firmly connected axially to one of the damper parts, although it is axially displaceable, but also coupled torsionally locked thereto. The coupling part divides a chamber into two partial chambers which are connected to one another via a throttling channel, said chamber being outwardly sealed and at least partially filled with damping liquid.

A disadvantage of the aforementioned solutions is the construction which is relatively complex from the manufacturing standpoint and the damping properties which are still insufficient for some applications.

WO 2008/049382 (=DE 202006016354 U1) discloses a device for compensating for and/or transmitting forces/moments and rotary movements between two components, wherein at least one joint module is arranged between the components, said module comprising a housing in which a piston is arranged, said piston dividing the internal chamber of the housing into two partial chambers to which pressure medium can be admitted, and connected, via coupling elements mounted in articulated manner, to the first and second components. No additional damping element for damping torsional vibrations between the components is provided, so that this solution cannot be employed as a torsional vibration damper.

SUMMARY OF THE INVENTION

It is an object of the invention to provide a torsional damper or torsional vibration damper which enables a relatively large rotation angle, has elastic properties and a simple construction in a small structure and is usable for a broad range of applications.

These and other objects are achieved by the torsional vibration damper as described and claimed hereinafter. Advantageous preferred embodiments are also disclosed.

The torsional vibration damper comprises two elements which are rotatable relative to one another making use of at least one coupling part which is arranged axially displaceable in a housing between the first element and the second element, wherein the first element is connected to the coupling part via first pivotably mounted rigid coupling elements and the second element is connected to the coupling part via second pivotably mounted rigid coupling elements, wherein the housing is divided by the coupling element into a first pressure chamber/partial chamber and a second pressure chamber/partial chamber, and the first pressure chamber has a connection to a first damping chamber and the second pressure chamber has a connection to a second damping chamber and the first pressure chamber and the first damping chamber are filled with a first damping medium and the second pressure chamber and the second damping chamber are filled with a second damping medium.

As a consequence of the first and second damping elements in conjunction with the coupling part and the coupling elements, the greatest possible variety of vibrations is damped between the first and second elements.

Herein at least the connection from the first pressure chamber/partial chamber to the first damping chamber is configured in the form of a first throttling bore and the connection from the second pressure chamber/partial chamber to the second evaporation chamber is configured in the form of a second throttling bore.

Preferably the first and second damping media are the same, and air or another gas is preferably used as the damping medium.

Furthermore, a liquid or a liquid/gas mixture can be used as the first and second damping medium.

The first and second damping medium situated in the partial chambers can also be a gel or a viscoelastic medium.

The first and second damping chambers preferably encircle the housing, whereby also a first damping element is arranged in the first damping chamber and a second damping element is arranged in the second damping chamber.

The first and second damping elements are preferably elastically deformable and/or compressible. Preferably the first and second damping elements are elastically compressible when pressure is applied via the first/second damping medium.

For this purpose, the first and second damping elements are configured, in particular, in the form of at least one elastic body, preferably in the form of a tube filled with a compressible medium (e.g., air or other gas). The tube can be, for example, an elastomer tube, whereby the first and second damping elements preferably encircle the housing.

It is also possible to connect the partial chambers to one another, so that the medium can flow out of one partial chamber into the other partial chamber. This preferably takes place making use of a suitable valve.

The coupling elements are preferably configured in the form of ball bars which are mounted rotationally articulated at both ends to the first and second elements and to the coupling part. The coupling part is mounted axially and rotationally movable in the housing.

It is possible for the first element to be a first shaft and the second element to be the housing. Furthermore, the first element can be configured as a first shaft and the second element can be configured as a second shaft or can be coupled to the shafts, wherein in this case, the housing is preferably fixed to the chassis.

The first element can, for example, be a driving element and the second element can be a driven element or vice versa.

It is also possible for the damping medium and/or the gas in the pressure chambers to be actively pressure controlled and the vibration damping to take place according to a control algorithm.

The invention solves the problem of providing a torsional vibration damper of simple design, which is flexibly adaptable to the most varied of applications and which is capable of achieving excellent damping properties, absorbing large torque peaks, and attaining large twist angles, by combining a damping medium with elastic elements.

BRIEF DESCRIPTION OF THE DRAWINGS

The invention will be described in greater detail hereinafter with reference to illustrative embodiments shown in the accompanying drawing figures, in which.

DETAILED DESCRIPTION OF PREFERRED EMBODIMENTS

Figure 1:
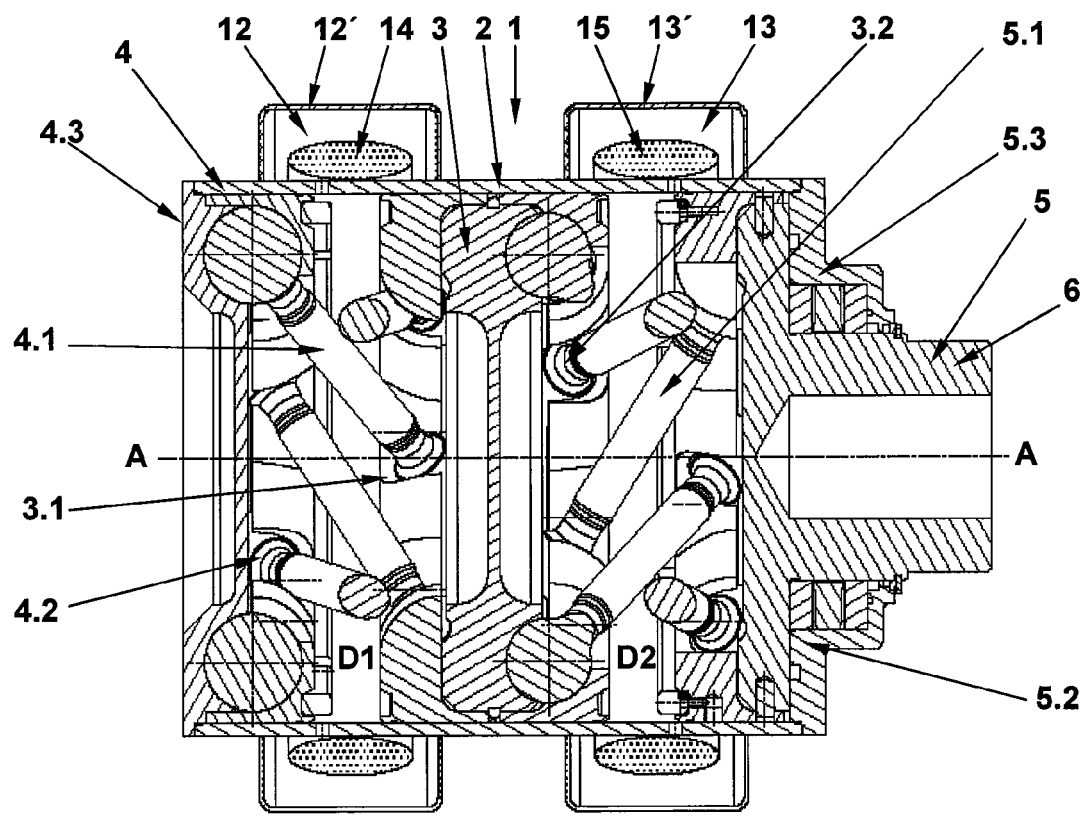
FIG. 1 is a schematic representation of a torsional vibration damper having two pressure chambers, in which a damping chamber with elastic elements is associated with each pressure chamber and the damping chambers are separated from one another.
Figure 2:
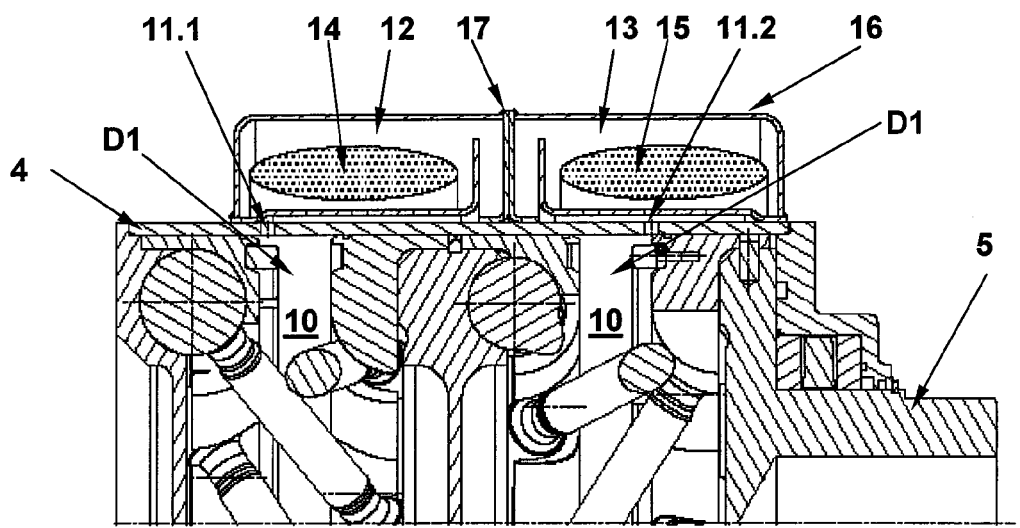
FIG. 2 is a schematic representation of a torsional vibration damper having two pressure chambers, in which a damping chamber is associated with each pressure chamber and both damping chambers are arranged in a common annular enclosure which encircles the housing.

FIGS. 1 and 2 show a torsional vibration damper 1 which comprises an axially displaceable head part 3 and a rotary shaft 6 arranged in a housing 2. The first element 4 comprises the housing 2 and includes a first housing cover 4.3. The second element 5 comprises the rotary shaft 6 which extends through a second housing cover 5.2. The housing 2 (first element 4) and the rotary shaft 6 (second element 5) are rotatable relative to one another. For this purpose, the housing 2 (first element 4) is connected to the coupling part 3 via first rotatably mounted rigid coupling elements 4.1 and the rotary shaft 6 (the second element 5) is connected to the coupling part 3 via second rotatably mounted rigid coupling elements 5.1. The first coupling elements 4.1 are constructed in the form of ball bars and are rotatably mounted, on one side, with their ball-shaped ends in a first receptacle 4.2 of the first element 4 (at the housing 2) and, on the other side, in a receptacle 3.1 of the coupling part 3. Similarly, the second coupling elements 5.1 are also constructed in the form of ball bars and are pivotably and rotatably mounted with their ball-shaped ends, on one side, in a second receptacle 5.2 of the second element 5 (rotary shaft 6) and, on the other side, in a receptacle 3.2 of the coupling part 3.

The first and second coupling elements 4.1 and 5.1 assume an angular position in relation to the longitudinal axis A of the torsional vibration damper 1 and are suitable for transmitting torques between the first and second elements (4, 5).

In order to damp torsional vibrations, according to FIGS. 1 and 2, a first pressure chamber/partial chamber D1 is formed between the first receptacle 4.2 (or the housing cover 4.3) and the coupling part 3 and a second pressure chamber/partial chamber D2 is formed between the second receptacle 5.2 (or the rotary shaft 6) and the coupling part 3.

A liquid damping medium 10 is present in the pressure chambers D1, D2, said damping medium 10 being able to flow via at least one throttling bore 11.1 out of the first pressure chamber D1 into a first damping chamber 12 and via at least one second throttling bore 11.2 out of the second pressure chamber D2 into a second damping chamber 13. The same or different damping media 10 can be present in the first pressure chamber D1 and the second pressure chamber D2. The first damping chamber 12 is configured in a first annular enclosure 12' which encircles the housing 2 and the second damping chamber 13 is configured in a second annular enclosure 13' which also encircles the housing 2, the two annular enclosures 12', 13' being spaced apart from one another.

Also situated in the first annular enclosure 12' is a first damping element 14 and situated in the second annular enclosure 13' is a second damping element 15. The two damping elements 14, 15 are configured in the form of a gas-filled or air-filled tube or an elastic element which can be, for example, an elastomer.

As distinct from FIG. 1, in the partial section according to FIG. 2, the first and second damping chambers 12, 13 are arranged immediately adjacent to one another in a common annular enclosure 16 which comprises a separating wall 17. Gas, a gas mixture or a liquid-gas mixture or a gel can be used as the damping medium.

If the housing 2 (first element 4) and the rotary shaft 6 (second element 5) are twisted relative to one another, the coupling elements 5.1, 5.2 assume a different spatial angular position and the coupling part 3 is moved along the longitudinal axis A as per FIG. 1 contrary to the damping force of the damping medium 10. In this process, the coupling part 3 also carries out a rotary movement.

The torsional vibrations between the first element 4 and the second element 5 are dampened and torque peaks are diminished by the coupling elements 5.1, 5.2 and the elasticity of the damping elements 14, 15.

In an alternative embodiment, it is also possible to configure, for example, the first and the second element 4, 5 to be rotatable in the form of two rotary shafts which are rotatably accommodated in the housing 2. The housing 2 is then naturally mounted firmly attached to the chassis.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A torsional vibration damper comprising two elements, which are rotatable relative to one another, and at least one coupling part, which is arranged in a housing so as to be axially displaceable; wherein:
   the housing is divided by the coupling element into a first pressure chamber/partial chamber and a second pressure chamber/partial chamber;
   wherein the first pressure chamber is connected to a first damping chamber;
   the second pressure chamber is connected to a second damping chamber;
   the first pressure chamber is filled with a damping medium;
   the first damping chamber is filled with the damping medium and/or a first damping element;
   the second pressure chamber is filled with a damping medium;
   the second damping chamber is filled with the damping medium and/or a second damping element, and
   the first damping chamber and the second damping chamber and/or the first damping element and the second damping element encircle the housing.

2. The torsional vibration damper as claimed in claim 1, wherein the connection from the first pressure chamber/partial chamber to the first damping chamber is configured in the form of a first throttling bore, and the connection from the second pressure chamber/partial chamber to the second damping chamber is configured in the form of a second throttling bore.

3. The torsional vibration damper as claimed in claim 1, wherein the damping medium is a gas, a liquid, a liquid/gas mixture, a gel, or a viscoelastic medium.

4. The torsional vibration damper as claimed in claim 1, wherein the first and second damping elements are elastically deformable and compressible.

5. The torsional vibration damper as claimed in claim 4, wherein the first and second damping elements can be elastically compressed by the application of pressure via the damping medium.

6. The torsional vibration damper as claimed in claim 4, wherein the first and second damping elements are each constructed in the form of an elastic body.

7. The torsional vibration damper as claimed in claim 6, wherein the elastic body is a tube filled with a gas or is an elastomer tube.

8. The torsional vibration damper as claimed in claim 1, wherein:
 the first element is connected to the coupling part via first pivotably mounted rigid coupling elements;
 the second element is coupled to the coupling part via second pivotably mounted rigid coupling elements;
 the coupling elements are constructed in the form of ball bars which are mounted in a rotationally articulated manner at both ends, and
 the coupling part is arranged axially and rotationally movable in the housing.

9. The torsional vibration damper as claimed in claim 1, wherein the first element is a first shaft, and the second element is the housing.

10. The torsional vibration damper as claimed in claim 1, wherein one of the first and second elements is a driving element, and the other of the first and second elements is a driven element.

11. The torsional vibration damper as claimed in claim 1, wherein the damping media or the gas in the damping elements is actively pressure-controlled, and the vibration damping and/or torsional damping is effected according to a control algorithm.

* * * * *